United States Patent Office 2,995,608
Patented Aug. 8, 1961

2,995,608
PROCESS FOR THE PRODUCTION OF HYDROXYARYLALKYL THIOETHERS
Detlef Delfs, Opladen, and Karlfried Wedemeyer, Koln-Stammheim, Germany, assignors to Farbenfabriken Bayer Aktiengesellschaft, Leverkusen, Germany, a corporation of Germany
No Drawing. Filed Apr. 8, 1958, Ser. No. 727,061
Claims priority, application Germany Apr. 13, 1957
4 Claims. (Cl. 260—609)

This invention relates to a novel process for the production of hydroxyaryl-alkyl thioethers.

It has been found that hydroxyaryl-alkyl thioethers are obtained if aromatic hydroxy compounds which contain at least one free p- or o-position are reacted with alkyl sulfenyl halides.

Aromatic hydroxy compounds suitable for the process of the invention are for example phenol, m-cresol, m-chlorophenol, 2-hydroxy-4-chlorotoluene, p-cresol, p-chlorophenol, resorcin, β-naphthol or 4-tert.-butyl phenol. Examples of alkyl sulfenyl halides which are suitable for the process: methyl sulfenyl chloride, ethyl sulfenyl chloride, butyl sulfenyl chloride and isopropyl sulfenyl chloride.

The new process can be carried out in a simple manner by reacting the components in the presence or absence of diluents. Suitable diluents are for example toluene, chloroform, chlorobenzene, the xylenes or tetrachloroethane. After completing the evolution of hydrogen halide, the reaction products can be worked up by known methods, for example by distillation or crystallisation. If desired, the process can be carried out continuously. In one preferred form of the process according to the invention, the alkyl sulfenyl halides are not added as such, but they are produced in the reaction mixture, for example by the action of sulfuryl halides on alkyl thiols or dialkyl disulfides. The alkyl sulfenyl halides formed thereby then react directly with the aromatic hydroxy compounds. This process is particularly advantageous, because alkyl sulfenyl halides are very unstable. Furthermore, it is possible by a suitable gradual addition of the sulfuryl halides to maintain concentration of the alkyl sulfenyl halides in the reaction mixture within certain limits. It has moreover been found that it can be of advantage in many cases, when using dialkyl disulfides, for not all of the dialkyl disulfide to be converted into the corresponding alkyl sulfenyl halide, but for only some of the dialkyl disulfides to be reacted. The excess of the dialkyl disulfides can easily be recovered, for example by distillation, and can be used without purification in another reaction. When operating in such a manner, it is possible in some cases to increase the yield of the hydroxyaryl-alkyl thioethers.

It is also advantageous if the process of the invention is carried out in the presence of condensation agents. Suitable condensation agents are, for example hydrochloric acid, benzene sulfonic acid, zinc chloride or boron trifluoride. Since hydrogen halide is liberated in the process of the invention, it is advisable in the simplest case to work in the presence of small quantities of water, so that hydrohalic acids, for example hydrochloric acid, are formed in the reaction mixtue.

The process of the invention is preferably carried out at not too high temperatures. In general temperatures within the range of about −20° C. up to about 50° C. are suitable. Often it is of advantage to keep the reaction mixture for some time at the higher temperature after the main reaction has finished.

The hydroxyaryl-alkyl thioethers obtainable by the new process can be used as intermediate products for pest control agents etc.

The following examples further illustrate the invention without, in any way, limiting it thereto.

Example 1

A solution of 2 mols of methyl sulfenyl chloride in 300 ml. of tetrachloroethane is added dropwise in the course of 1½ hours to a solution of 2.6 mols of phenol in 150 ml. of toluene at 5 to 8° C. After the evolution of hydrogen chloride has ceased, the mixture is slowly heated and kept for 1½ hours at 50° C. It is then distilled in vacuo. 153 grams of 4-hydroxy-1-methyl mercaptobenzene are obtained; melting point 85° C., boiling point$_{12}$ 145° C.

Example 2

A solution of 2 mols of methyl sulfenyl chloride in 300 ml. of tetrachloroethane is added dropwise within 2 hours to a solution of 289 grams of m-cresol in 150 ml. of toluene at 5 to 8° C. while cooling. Stirring is continued for 3 hours at 20° C. and thereafter the combined solution is heated for 1½ hours at 50° C. By subsequent distillation, 114 grams of 3-hydroxy-6-methyl mercaptotoluene are obtained with a boiling point$_5$ of 130° C. and a melting point of 57° C.

Example 3

2 mols of methyl sulfenyl chloride, dissolved in 300 ml. of tetrachloroethane, are added dropwise within 2 hours to a solution of 344 grams of m-chlorophenol in 150 ml. of toluene at 5 to 6° C. while cooling. The combined solution is stirred for 3 hours at 20° C., heated for 1½ hours at 50° C. and then distilled. 186 grams of 3-hydroxy-6-methyl mercaptochlorobenzene are obtained with a boiling point$_7$: 158–160° C. Melting point: 66.5° C.

Example 4

123 grams of sulfuryl chloride are added dropwise over a period of 1½ hours to a solution of 250 grams of phenol and 94 grams of dimethyl disulfide in 150 ml. of chloroform at 5 to 8° C. Stirring is continued for 3 hours at 20° C., the combined solution is heated for 1½ hours at 50° C. and distilled in vacuo. 18.3 grams of dimethyl disulfide and 115 grams of phenol are recovered. 144 grams of 4-hydroxyl-1-methyl mercaptobenzene then distill over with a boiling point$_{12}$ of 145° C.

Example 5

123 grams of sulfuryl chloride are added dropwise in the course of 4½ hours to a solution of 250 grams of phenol in 94 grams of dimethyl disulfide at 30° C. The mixture is stirred for 1 hour at 30° C., heated for 1½ hours at 50° C. and distilled. 96 grams of 4-hydroxy-1-methyl mercaptobenzene are obtained. In addition, 36 grams of dimethyl disulfide and 137 grams of phenol are recovered.

Example 6

123 grams of sulfuryl chloride are added dropwise in the course of 4½ hours and at 5 to 10° C. to a mixture of 250 grams of phenol and 94 grams of dimethyl disulfide, in which some of the phenol has still not dissolved. Stirring is continued for 3 hours at 20° C. and the mixture heated for 1½ hours at 50° C. Vacuum distillation is then carried out. Yield: 148 grams of 4-hydroxy-1-methyl mercaptobenzene. 19 grams of dimethyl disulfide and 113 grams of phenol were recovered.

Example 7

135 grams of sulfuryl chloride are added dropwise in the course of 4½ hours at 3 to 5° C. to a mixture of 280 grams of phenol and 188 grams of dimethyl disulfide. Stirring is then continued for 3 hours at 20° C.

and the mixture heated for 1½ hours at 50° C. Vacuum distillation is then carried out. Yield: 180 grams of 4-hydroxy-1-methyl mercaptobenzene. 98.5 grams of dimethyl disulfide and 110 grams of phenol are recovered.

Example 8

185 grams of sulfuryl chloride are added dropwise in the course of 7½ hours at 3 to 5° C. to a solution of 250 grams of phenol and 94 grams of dimethyl disulfide in 150 ml. of chloroform. Stirring is then continued for 3 hours at 20° C. and the mixture heated for 1½ hours at 50° C. Vacuum distillation is then carried out. Yield: 168 grams of 4-hydroxy-1-methyl mercaptobenzene.

Example 9

123 grams of sulfuryl chloride are added dropwise in 1½ hours at 5° C. to a solution of 289 grams of o-cresol and 94 grams of dimethyl disulfide in 150 ml. of toluene. Stirring is continued for 3 hours at 20° C. and then the mixture was heated for 1½ hours at 50° C. 80 grams of 2-hydroxy-5-methyl mercaptotoluene (B.P.$_5$: 136 to 138° C.) are recovered by vacuum distillation.

Example 10

By using p-cresol instead of o-cresol with the method of Example 9, 75 grams of 4-hydroxy-5-methyl mercaptotoluene are obtained with a boiling point$_5$ of 96° C.

Example 11

If m-cresol is used instead of o-cresol in the method set out in Example 9, 100 grams of 3-hydroxy-6-methyl mercaptotoluene are obtained with a melting point of 57° C.

Example 12

By using 344 grams of m-chlorophenol instead of o-cresol in the method described in Example 9, 145 grams of 3-hydroxy-6-methyl mercaptochlorobenzene are obtained with a boiling point$_5$ of 148° C.

Example 13

By using 380 grams of 4-chloro-2-hydroxy-toluene instead of o-cresol in the method described in Example 9, 75 grams of 2-hydroxy-4-chloro-5-methyl mercaptotoluene are obtained with a melting point of 109.5° C.

Example 14

By using 380 grams of 6-chloro-3-hydroxy-toluene instead of o-cresol in the method described in Example 9, 106 grams of 3-hydroxy-4-methyl mercapto-6-chlorotoluene are obtained with a boiling point$_9$ of 151° C.

Example 15

240 grams of sulfuryl chloride are added dropwise at 0 to 5° C. and in the course of 6 hours to a mixture of 250 grams of phenol, 85 grams of methyl mercaptan and 150 ml. of chloroform. Stirring is continued for 1 hour at room temperature and then the mixture heated for 1½ hours at 50° C. Vacuum distillation yields 134.5 grams of 4-hydroxymethyl mercaptobenzene.

Example 16

135 grams of sulfuryl chloride are added dropwise in the course of 4½ hours at 3 to 5° C. to a mixture of 280 grams of phenol, 188 grams of dimethyl disulfide and 1 gram of ferric chloride. Stirring is continued for 1 hour at room temperature and then the mixture is heated to 50° C. until the evolution of hydrogen chloride has ceased. Vacuum distillation yields 190 grams of 4-hydroxymethyl mercaptobenzene. 94 grams of dimethyl disulfide and 110 grams of phenol are recovered.

Example 17

If the ferric chloride in Example 16 is replaced by 2 drops of water, 200 grams of 4-hydroxymethyl mercaptobenzene are obtained by distillation.

Example 18

83 grams of sulfuryl chloride are added dropwise over a period of 2½ hours at 5° C. to a mixture of 219 grams of n-dibutyl disulfide and 300 grams of phenol. The mixture is then heated over a period of 1½ hours to 50° C. and stirred at this temperature until the evolution of gas has ended. Vacuum distillation yields 140 grams of 4-hydroxy-n-butyl mercaptobenzene. Melting point: 46.5° C.

Example 19

135 grams of sulfurylchloride are added dropwise over a period of 4 hours and at 5° C. to a suspension of 490 grams of phenol in 244 grams of diethyl disulfide and 70 ml. of chloroform. The mixture is then heated within 2 hours to 50° C. and stirred at this temperature until evolution of hydrogen chloride has ended. Distillation yields 210 grams of 4-hydroxy-ethyl mercaptobenzene. Melting point: 40.8° C. 316 grams of phenol and 134 grams of diethyl disulfide are recovered.

Example 20

135 grams of sulfuryl chloride are added dropwise over a period of 4 hours at 10° C. to a suspension of 288 grams of β-naphthol in 188 grams of dimethyl disulfide and 415 ml. of glacial acetic acid. Stirring is continued for 1 hour at 10° C. and then at 50° C. until evolution of gas has ended. 45 grams of 2-hydroxy-methyl mercapto-naphthalene are obtained by vacuum distillation. Boiling point$_6$ 151° C.

We claim:

1. A process for the production of hydroxyarylalkyl thioethers which comprises reacting an aromatic hydroxy compound selected from the group consisting of phenol and naphthol series, said compound containing at least one member selected from the group consisting of a free p-position and a free o-position with a lower alkyl sulfenyl halide, said alkyl sulfenyl halide being formed in situ by contacting a member selected from the group consisting of dialkyl disulfides and alkyl thiols with a sulfuryl chloride.

2. The process of claim 1 wherein the aromatic hydroxy compound is phenol and the dialkyl disulfide is dimethyl disulfide.

3. The process of claim 1 wherein the aromatic hydroxy compound is m-cresol and the dialkyl disulfide is dimethyl disulfide.

4. The process of claim 1 wherein the aromatic hydroxy compound is phenol and the alkyl thiol is methyl mercaptan.

References Cited in the file of this patent

Muller: Arbeitshmethoden der Organischen Chemie, Vierte Auflage, vol. 9, page 139 (1952).